Patented Apr. 21, 1942

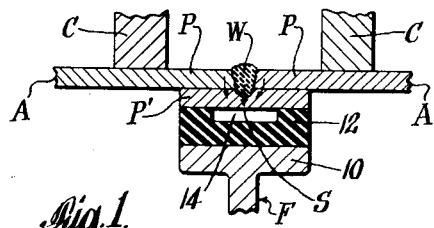
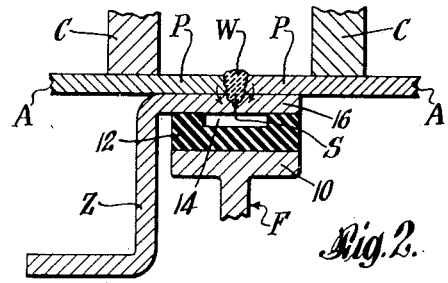
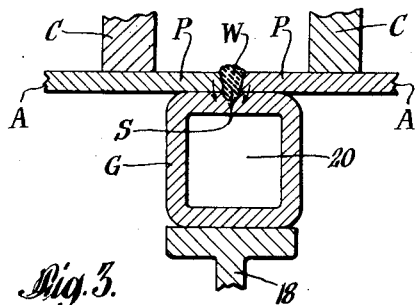
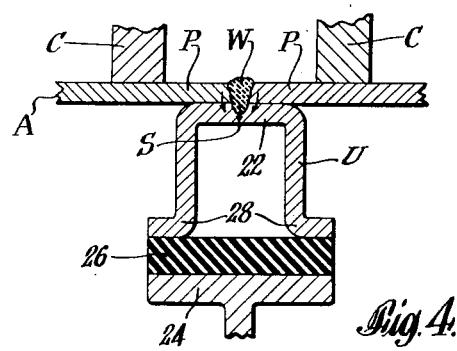
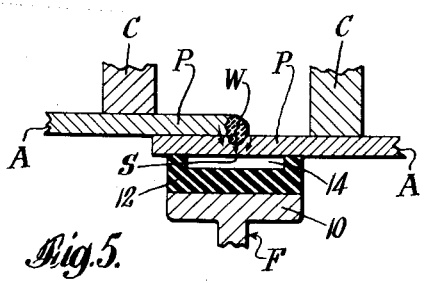
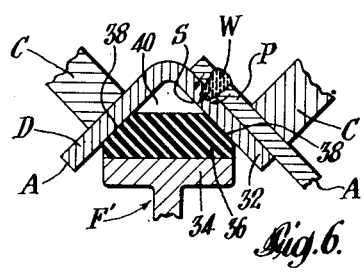
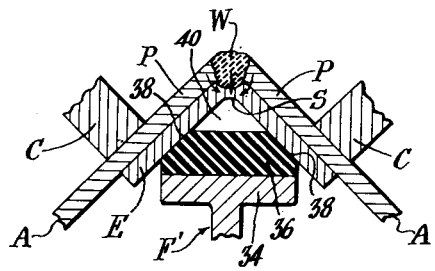
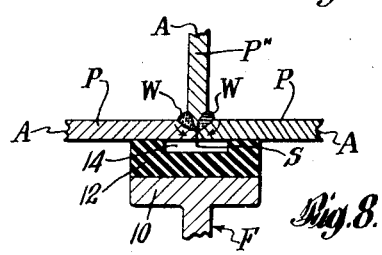

2,280,150

UNITED STATES PATENT OFFICE 2,280,150

HEATING OF METALS

Franklin C. Hasse and Arthur A. Bernard, Chicago, Ill., assignors to The Linde Air Products Company, a corporation of Ohio Application March 1, 1940, Serial No. 321,620

16 Claims. (Cl. 113—112)

This invention relates to the heating of metals, and more particularly to a method of controlling the temperature gradient and heat distribution in locally heated metal members.

While the principles of the invention are equally applicable to various types of operations involving the local application of heat to metal members, the invention, for the purpose of illustration, will be described in some detail as applied to the weld uniting of metal sheets and plates of large area such as those now used extensively in the fabrication of light-weight railway rolling stock.

Welding operations necessitate the local application of a concentrated source of high temperature heat, the amount of heat applied and the temperature locally attained depending upon the type of weld to be made. Thus, the temperature at the heated area may be only sufficient to render the meeting surfaces of the members semi-plastic, as in forge welding, or sufficient to melt the meeting surfaces thoroughly, as in full fusion welding. Although, in welding operations the heat is usually applied only to, or adjacent to, the surfaces to be united, metal adjacent to and remote from the heated surfaces is also heated by conduction from the directly heated surfaces. Such heating, being uneven, tends to warp and distort the welded article.

The problem of shrinking and warping is particularly important in the fabrication of welded structures from large sheets and plates, such as those which are now used in the construction of railway box cars, gondola cars, and other rolling stock. As the metal sheets and plates used in this particular field are relatively thin, they are peculiarly susceptible to warping during welding, as the small mass of metal is not strong enough to be resistant to stresses developed by the expansion and contraction incidental to the localized application of heat to the metal plate.

As the grain size is influenced by the time interval during which the temperature is maintained in or above the critical range, it is desirable to cool the metal rapidly to below the critical range, as soon as possible after it has been deposited.

Also of importance are the effects resulting from the localized heating of such plates when they are made from austenitic-type chromium-nickel stainless steel. When stainless steel of this type is heated between 800° F. and 1600° F., intergranular precipitation of carbides may occur, the extent of the precipitation being a function of the time interval during which the steel is held at temperatures which cause the precipitation. Under those conditions which produce carbide precipitation, the steel loses some of its resistance to corrosion, and at the higher temperatures within the range it loses some of its toughness. The extent of precipitation can be greatly lessened by increasing the rate at which the steel passes through the precipitation temperature range. If austenitic-type stainless steel be rapidly cooled from above 1800° F. to below 800° F., its toughness and resistance to corrosion are preserved at their best.

It is among the objects of this invention to provide an improved method of effectively controlling the heat gradient during the localized heating of metal by efficiently conducting heat therefrom at a rate proportional to the rate of heat input; to provide an improved method of preventing the conduction of heat into metal members, which are locally heated, beyond a point a minimum distance from the point of heat application; to provide an improved method of preventing shrinking and warping of metal plates during welding operations, and eliminating the necessity for stress relieving after the welding operation, by reducing the development of internal stresses in such plates during the welding operation; and to provide an improved method of producing refined grain structures in welded metals, and for maintaining toughness and corrosion resistance of austenitic-type stainless steel during localized heating thereof.

These and other objects of the invention will in part be obvious and in part become apparent from the following description and the accompanying drawing, in which:

Fig. 1 illustrates diagrammatically a typical embodiment of this invention as it may be used for removing heat during a welding operation; and Figs. 2 to 8, inclusive, illustrate diagrammatically several modifications of the embodiment of the invention shown in Fig. 1.

Generally speaking, the invention resides in the controlled application of heat absorbing fluid and/or cooling media, such as liquids or gases, directly in contact with a metal body which is being progressively locally heated to an elevated temperature, at a zone immediately adjacent to or coextensive with the zone of heat application, in such a manner that a definite heat gradient is established from the point of heat application to the point of heat withdrawal, and the heat absorbing medium is applied at such rates that the rate of heat removal is approximately proportional and preferably substantially equal to the rate of heat input. By proper application of the heat absorbing medium, with relation to the point of heat application, conduction of heat through the remaining mass of metal is restrained so that the transition zone between the heated and unheated masses of the metal can be maintained only a few thousandths of an inch from the point of heat application. When so applied, there is no heat transmitted outwardly from the point of heat application into the main body of metal, and due to the small mass of the metal which is permitted to attain a high temperature, little opportunity is afforded for the development of strains and stresses, and consequently shrinking and warping are minimized and usually substantially eliminated.

The invention is based upon the principle that heat in a body tends to flow toward the point of lowest temperature. This principle is somewhat analogous to that of the flow of electric current in a conductor, which, as is common knowledge, flows in the conductor from a point of high potential to a point of relatively low potential. Thus, by proper location of the heat absorbing medium, a heat gradient may be established between two points in such zone, which heat gradient is substantially steeper than any heat gradient between points in such zone and points in the remaining mass of metal, and the heat may be caused to flow in a definite path through the heat conductive member. So long as a point of sufficiently low temperature is maintained at a suitable location adjacent to the point of application of heat, all the applied heat will tend to flow directly to the point of application of the absorbing medium rather than through the adjacent masses of the heat conductive member.

The invention takes cognizance of the fact that water, while a good absorber of heat, in that it has a high specific heat, is not a good conductor thereof. The transfer of heat through water depends largely upon convection and stirring. The heat from a heated body is absorbed by the film of water immediately adjacent the heated body but is transmitted only slowly from this film to adjacent films or layers of water. In order to provide effective heat withdrawal it is necessary that the water be circulated in order that currents may be set up therein and new films of water brought into contact with the heated surface.

As the heat absorbing medium is circulated in direct contact with the heated members, there is no air film between the members and the medium. The efficiency of heat absorption is thereby enhanced a substantial amount, both by the absence of the air film and by the circulation of the heat absorbing medium. The medium may be either water, gas, refrigerant, or any other fluid, dependent upon the particular heat requirements of the particular application. To prevent the heat absorbing medium remaining in crevices or cracks in the metal, if a fluid such as water is used, the circulating system may be dried by a suitable gas or by a vacuum, when the heating operation is completed.

Referring to Fig. 1 of the drawing, a pair of relatively thin sheets or plates P, of considerable area, are illustrated with their adjacent edges in juxtaposition to form a welding seam and in position to be weld united to a similar sheet or plate P' by a weld W. The sheet P' is supported upon a special heat absorbing fixture F, and the sheets P are disposed on sheet P' with their adjacent edges in substantially abutting relation. Clamps C are provided to hold the work in position for welding.

Fixture F comprises a support such as an anvil or bracket 10 to which is secured a member 12 having a wide, extremely shallow channel 14 formed in its upper surface. A suitable heat absorbing medium, desirably at a sub-atmospheric temperature, is circulated under pressure through channel 14 to absorb heat from the work at point S. Due to the shape of channel 14, the heat absorbing medium is in the form of a thin film, as only the layer of absorbing medium contacting plate P' will absorb heat, and thus a great depth of heat absorbing medium is unessential and inefficient. The effective cooling procedure is to circulate the medium against plate P' under pressure so that a new film of the medium is constantly coming in contact with the plate.

Under the conditions illustrated, the portions of the work at the weld W are at a relatively high temperature, while at points A near the extremities of the work, the sheets or plates are at substantially normal atmospheric temperature. If no heat absorbing medium were applied adjacent point S, the heat gradient in the members P, P' would extend from the weld W to points A and heat would flow from the weld to points A in proportion to the difference between the respective temperatures at these points. It will be apparent that the work would thus be heated to varying temperatures throughout substantially all the distance between weld W and points A. Consequently, stresses would be set up within these limits resulting in warping of the sheets upon subsequent cooling thereof.

However, when the proper heat absorbing medium at the proper sub-atmospheric temperature is circulated through the narrow longitudinally extending zone comprising channel 14, the arrangement of Fig. 1 is highly efficient. As the point S is at sub-atmospheric temperature, the heat passes directly through the work from weld W to point S where it is absorbed by the heat absorbing medium along a single line within the heated zone. No heat flows outwardly through the plates toward points A. As an example of the efficiency of heat absorption, it should be noted that pure India rubber, which softens at about 260° F., may be used for member 12, although the welding temperature immediately adjacent thereto may be in excess of 2700° F., as the heat is all absorbed before it reaches the parts of member 12 contacting plate P'. It should be understood, however, that the member 12 may be formed of any suitable material such as fibre, copper, or steel, and need not be formed of rubber.

In the arrangement illustrated in Fig. 2, a pair of sheets or plates P are to be weld united to a structural member such as a Z-bar designated Z. In this instance, the sheets P are arranged with their adjacent edges in substantially abutting relation and positioned on one side of a leg 16 of the bar Z. The fixture F, as used in the arrangement of Fig. 1, is disposed against the opposite side of leg 16, and clamps C maintain the several elements in position. As illustrated by the arrows, all the heat passes directly through the weld W and leg 16 from the point of heat application to point S; where the heat is absorbed at a rate proportional to the rate of heat input by a heat absorbing medium passing under pressure through the flat shallow channel 14 in contact with leg 16.

Figs. 3 and 4 illustrate the application of the invention to the weld uniting of metallic members of which one or more may form a completely or partially closed channel or conduit. Thus, in Fig. 3, sheets or plates P are held in edge to edge abutment on a box girder G, and the parts are maintained in position on a bracket 18 by clamps C. The interior passage 20 of girder G forms a conduit for the circulation of cooling medium under pressure, so that the special heat absorbing fixture F (Fig. 1) is not needed in this instance, the support or bracket 18 being sufficient. While the fluid passage is not of optimum dimensions, the practical advantages resulting from using one of the workpieces as a conduit for the heat absorbing medium overbalance any minor disadvantages; and by the circulation of sufficient fluid under pressure to substantially fill passage 20, the objects of the invention are effectively attained.

In the arrangement of Fig. 4, sheets or plates P are to be weld united to the web 22 of a U-shaped channel U, against which they are positioned by clamps C. The open side of the channel is closed by a bracket 24, supporting a suitable gasket 26 engaging the channel flanges 28. Heat flows through weld W to point S where it is absorbed rapidly by a heat absorbing medium circulated under pressure through the conduit formed by channel U and gasket 26. No heat flows through the sheets to points A in either the arrangement of Fig. 3 or that of Fig. 4.

The arrangement of Fig. 5 illustrates the formation of a lap weld between metallic members such as sheets or plates. In this instance, the members P are overlapped and held between clamps C and fixture F. The arrangement and the operation of the invention are otherwise the same as previously described in connection with Figs. 1 and 2.

Figs. 6 and 7 illustrate the application of the invention to the formation of angular or corner welds. In these arrangements, a special fixture F' is used as part of the cooling medium conduit and work supporting means.

Referring particularly to Fig. 6, a metallic member such as a sheet P, to be welded to an angle bar or bent plate D, is lapped over one leg 32 of the plate D and held thereagainst by clamps C. Fixture F' includes a bracket 34 and a gasket 36 having bevelled edges 38 in fluid-tight engagement with the members to be weld united, thereby forming, in conjunction with the interior surface of angle bar D, a triangular channel or conduit 40 for the heat absorbing medium. The medium circulated under pressure through channel 40 absorbs heat at point S, establishing thereby a heat gradient through weld W. No heat flows through the members P or D to the points A.

In Fig. 7, a pair of sheets or structural members P, which are to be weld united to an angle E by a weld W, are arranged in overlapping relation with the outer surface of the legs of the angle and with their edges in adjacent relation. The fixture F' contacts each leg of the angle to form a conduit or channel in which heat absorbing medium is circulated under pressure to absorb heat at point S, establishing heat gradients through weld W and preventing heat flow to points A.

The application of the principles of the invention to fillet welding is illustrated in Fig. 8, wherein substantially abutting members such as sheets P, to be weld united by fillet welds W to another member such as a sheet P'', are supported on the special heat absorbing fixture F and held in position by sheet P'', which is perpendicular to the sheets P and engages the substantially abutting edges of the sheets. The heat is absorbed at S by heat absorbing medium circulated under pressure through channel 14. No heat flows outwardly to points A, which are at atmospheric or room temperature, as the heat gradient through the welds W to points S is steeper than that through the sheets P or P'' to points A.

From the foregoing description, it will be apparent that the invention is based upon the laws of heat flow. By establishing a point at relatively low temperature immediately adjacent the welding zone, a steep heat gradient is provided causing applied heat units to flow to this point and preventing flow of heat outwardly through the metallic members. Furthermore, the high heat absorbing properties of water or other heat absorbing media are used effectively, while the low heat conductivity of such media is overcome by using shallow films or strata of the media circulating under pressure in contact with the work at the welding point. Warping is prevented as there is substantially no heating of metal beyond a point a few thousandths of an inch from the welding zone, and due to the rapid absorption of heat by the heat absorbing media.

As distinguished from prior methods, in which a heat absorbing medium has been applied to the work at points spaced a substantial distance from the zone of heat application, the present invention resides in the application of the medium at sub-atmospheric temperature in a thin film under pressure at a single point, line, zone or confined path directly opposite and coextensive with the point, line, or zone of heat application. There is thus established a single, steep heat gradient through the heated zone, and no heat flows outwardly therefrom through the work. On the other hand, in such prior methods, heat gradients are established through substantial portions of the work, resulting in warping thereof.

Additionally, when the invention is applied to the welding of stainless steel, loss of the protecting chromium from the grains is prevented due to the extremely rapid rate at which heat is withdrawn from the metal and due to the very narrow heat affected zone.

While certain embodiments of the invention have been illustrated and described in order to furnish a clear understanding of the principles involved, it will be obvious to those skilled in the art that the invention may be otherwise embodied and practiced without departing from the principles or exceeding the scope of the invention.

What is claimed is:

1. In the method of locally heating a metallic member in which a concentrated source of high temperature heat is applied progressively to and along a narrow longitudinally extending zone of such metallic member to heat such zone to an elevated temperature, the step of preventing distortion of such member which comprises, during such progressive application of heat, restraining conduction of heat from such narrow zone to the remaining mass of such member by establishing, between two points in such narrow longitudinally extending heated zone, a single heat gradient substantially steeper than any heat gradient between points in such zone and points in the remaining mass of such member.

2. A method as claimed in claim 1, in which such source of heat is applied to one side of such zone and the opposite side of such zone is maintained at a temperature substantially less than the temperatures in the remaining mass of such member.

3. A method as claimed in claim 1, in which all of such applied heat is absorbed from such member along a single line within such zone.

4. In the method of locally heating a metallic member in which a concentrated source of high temperature heat is applied progressively to and along a narrow longitudinally extending zone on one side of such metallic member to heat such zone to an elevated temperature, the step of preventing distortion of such member which comprises, during such progressive application of heat, restraining conduction of heat from such narrow zone to the remaining mass of such member by progressively applying a fluid heat absorbing medium under pressure directly to the opposite side of such member and in a single confined path aligned with such narrow longitudinally extending zone.

5. The method claimed in claim 4, in which said fluid heat absorbing medium is applied in such controlled amount as to absorb heat from such heated zone at a rate substantially equal to the rate of heat input to such heated zone.

6. The method claimed in claim 4, in which said fluid heat absorbing medium is applied in a confined path directly opposite and coextensive with such heated zone.

7. The method claimed in claim 4, in which said fluid heat absorbing medium comprises water at a temperature less than atmospheric temperature.

8. The method claimed in claim 4, in which said fluid heat absorbing medium comprises a refrigerant maintained at a subatmospheric temperature.

9. A method of weld uniting metallic members which comprises arranging said members with their adjacent edges in juxtaposition to form a welding seam, heating such juxtaposed edges to an elevated temperature sufficient to permit a metallic union therebetween, and, during such heating, progressively applying a fluid heat absorbing medium under pressure directly to such members in a single confined path aligned with said juxtaposed edges.

10. A method of weld uniting metallic members which comprises arranging said members with their adjacent edges in juxtaposition to form a welding seam, heating such juxtaposed edges to an elevated temperature sufficient to permit a metallic union therebetween, and, during such heating, progressively applying a fluid heat absorbing medium under pressure directly to such members in a single confined channel directly opposite and coextensive with such welding seam.

11. A method as claimed in claim 10, in which such fluid heat absorbing medium is circulated in an extremely shallow channel whose width is substantially greater than the width of such welding seam.

12. A method of weld uniting metallic members, at least one of which is provided with a passage extending longitudinally therethrough, which comprises arranging said members in juxtaposition to form a welding seam, heating the juxtaposed portions of said members to an elevated temperature sufficient to permit a metallic union therebetween, and, during such heating, circulating a fluid heat absorbing medium through such passage in a volume sufficient to completely fill said passage and in such amount as to absorb heat from such juxtaposed portions at a rate substantially equal to the rate of heat input to such portions.

13. A method of weld uniting metallic members which comprises supporting a pair of such members, with their edges in juxtaposition, on a third member, progressively applying high temperature heat to and along such juxtaposed edges to weld unite such members, and progressively absorbing substantially all of such heat along a single narrow zone on such third member directly opposite and in alignment with such juxtaposed edges.

14. A method of lap welding metallic members which comprises arranging said members in overlapping relation, progressively applying high temperature heat along at least one longitudinally extending zone on one side of one of such members, and progressively absorbing substantially all of such heat along a single narrow zone on one side of another of such members and aligned with such zone or zones of heat application.

15. A method of weld uniting a pair of metallic plates to an angle which comprises arranging each of said plates in overlapping relation with the outside surface of one of the legs of such angle and with the plate ends in adjacent relation, progressively applying high temperature heat along a longitudinally extending zone between the adjacent ends of said plates and the outside corner of said angle, and progressively absorbing substantially all of such heat by circulating a fluid heat absorbing medium through a single confined path formed in part by the interior surface of such angle.

16. A method of weld uniting metallic members which comprises arranging a pair of such members with their edges in juxtaposition, arranging a third member perpendicularly to such pair of members and with one edge aligned with such juxtaposed edges, progressively applying high temperature heat to all of such edges to form a pair of continuous fillet welds uniting such members, and progressively absorbing substantially all of such heat along a single narrow zone beneath such pair of members and on the opposite side from and aligned with such third member.

FRANKLIN C. HASSE.
ARTHUR A. BERNARD.